Feb. 13, 1940.  R. L. MILLER  2,190,240
FENDER FOR PLOWS
Filed Dec. 29, 1938
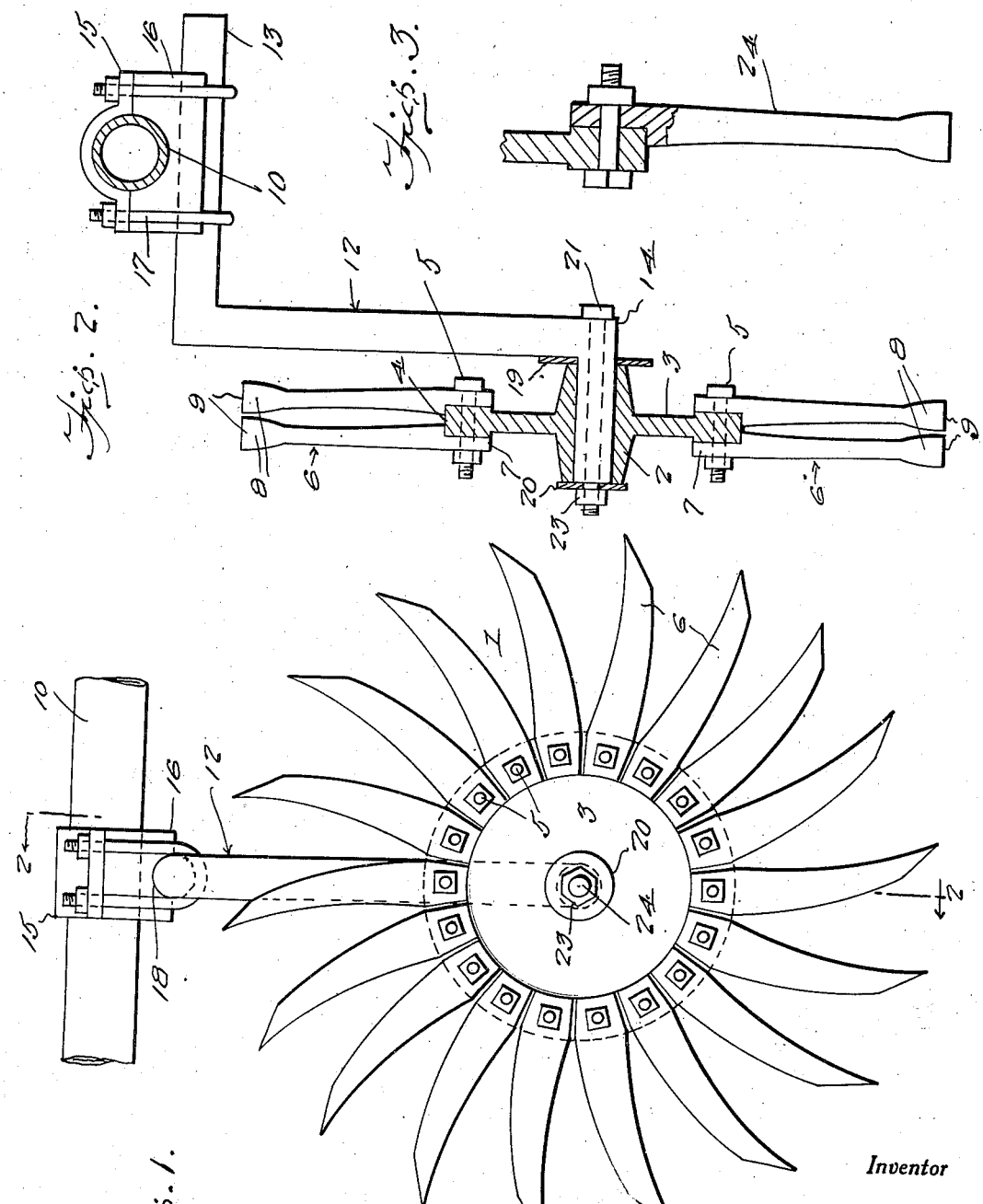
Inventor
*R. L. Miller*
By *Clarence A. O'Brien*
and *Hyman Berman*
Attorneys Patented Feb. 13, 1940

2,190,240

UNITED STATES PATENT OFFICE 2,190,240

FENDER FOR PLOWS

Robert L. Miller, Webb City, Mo.

Application December 29, 1938, Serial No. 248,316

1 Claim. (Cl. 97—209)

My invention relates to fenders for use on plows, cultivators, and the like.

The principal object of the invention is to provide an efficient device of this character which may be easily and quickly attached to present-day plows and cultivators to cut weeds and grass alongside the plow, or cultivator shovel, and break up and pulverize clods along the ridge thrown up by the plow or cultivator shovel, as the case may be.

Other and subordinate objects are also comprehended by my invention, all of which together with the precise nature of my improvements will be readily understood when the succeeding description and claim are read with reference to the drawing accompanying and forming part of this specification.

In said drawing:

Figure 1 is a view in side elevation of a fender constructed in accordance with my invention and applied to a cultivator beam, Figure 2 is a view in vertical section taken on the line 2—2 of Figure 1 looking in the direction indicated by the arrows, and Figure 3 is a detail fragmentary view similar to Figure 2 illustrating a modification of the invention.

Referring to the drawing by numerals, in the preferred form thereof, the fender of my invention comprises a rotary toothed unit 1 including a hub 2 having a radial central flange 3 provided with an outer edge bead 4 to which are bolted, as at 5, teeth 6. The teeth 6 are elongated bar-like elements and are arranged about the bead 4 in equidistantly spaced pairs, the teeth of each pair being bolted in opposed laterally spaced relation to opposite sides of said bead and having rabbeted inner ends 7 fitting against and over said bead. Preferably the outer ends of said sides flare laterally as at 8, and are provided with transversely straight sharp cutting edges 9. Also said teeth curve longitudinally and similarly.

The described unit is rotatably mounted on a cultivator, or plow, beam, represented at 10 preferably slightly in advance of a plow share or cultivator shovel, as the case may be, not shown, to travel along the ridge on one side of the row and for rotation under such travel with the cutting edges 9 entering the earth of said ridge.

The means for mounting the unit 1 comprises a tubular bracket 12 depending from said beam 10 and comprising right angled oppositely extending upper and lower arms 13 and 14. The upper arm 13 is attached to the beam 10 by means of a pair of upper and lower clamping blocks 15 and 16 engaging opposite sides of said beam 10, and U-bolts 17 securing said blocks in clamping relation. The under side of the lower block 16 is channeled, as at 18, to seat the arm 13 therein, said arm being held in position by said U-bolts, as will be clear. The arm 14 functions as an axle for said unit 1, the hub 2 being sleeved thereon between washers 19 and 20, the bolt 21 being extended through said arm 14 with one washer 20 thereon and a nut 23 threaded onto the outer end thereof to secure the hub 2 on said arm 14. The unit 1 is mounted on the arm 14 in a position such that the teeth 6 curve forwardly as regard the direction of rotation of the unit.

In the modified form of the invention, shown in Figure 3, single teeth 24 are utilized instead of pairs.

The operation of the invention will be readily understood. Under rotation of the unit 1, the teeth 6 cut up grass and weeds and throw the same rearwardly, together with stones, while at the same time breaking up clods in the ridge and pulverizing the earth in a highly efficient manner.

The foregoing will, it is believed, suffice to impart a clear understanding of my invention without further explanation.

Manifestly, the invention as described, is susceptible of modification in other respects than as set forth herein, and right is herein reserved to such other modifications as fall within the scope of the subjoined claim.

What I claim is:

A fender and ground pulverizer for attachment to a plow beam alongside the plow element comprising a bracket member having a right angled lower end, means to attach said bracket member to said beam in suspended position with the right angled end laterally extending, and a wheel-like unit rotatably mounted on said right angled end including substantially radial teeth and adapted for rotation under travel of the plow and engagement of said teeth with the ground, said teeth being arranged in opposed pairs spaced around the unit equidistantly, the teeth of each pair being disposed upon opposite sides of said unit and terminating in enlarged spade-like ends closely spaced edgewise and having straight sharp digging edges, and the teeth of each pair including shanks having opposed concaved edges providing a clearance therebetween.

ROBERT L. MILLER.